June 20, 1933.  E. H. BUNCE ET AL  1,914,482
METALLURGICAL FURNACE
Filed Jan. 23, 1930
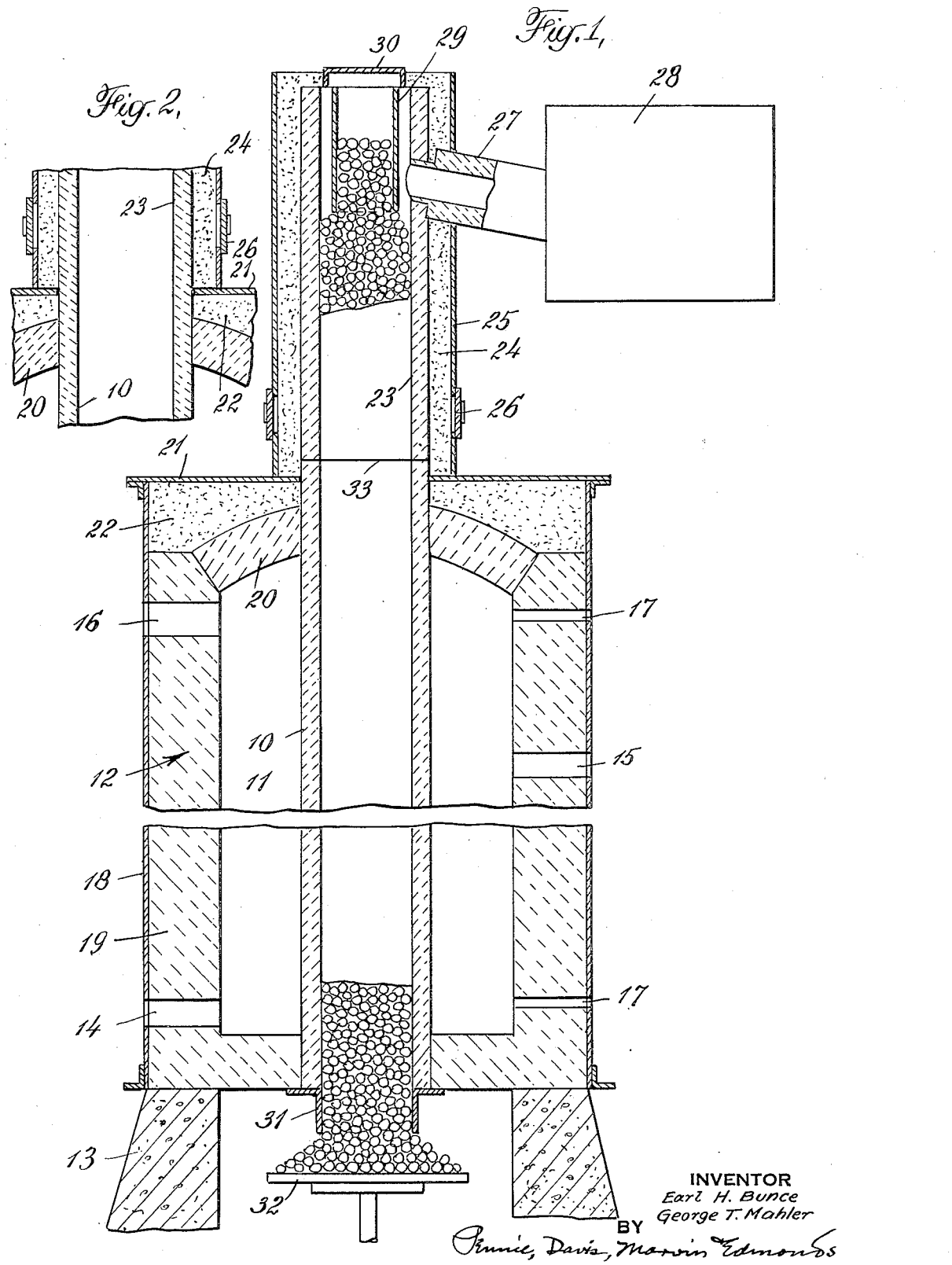
INVENTOR
Earl H. Bunce
George T. Mahler
BY
Pennie, Davis, Marvin Edmonds
ATTORNEYS Patented June 20, 1933

1,914,482

UNITED STATES PATENT OFFICE

EARL H. BUNCE AND GEORGE T. MAHLER, OF PALMERTON, PENNSYLVANIA, ASSIGNORS TO THE NEW JERSEY ZINC COMPANY, OF NEW YORK, N. Y., A CORPORATION OF NEW JERSEY

METALLURGICAL FURNACE

Application filed January 23, 1930. Serial No. 422,766.

This invention relates to metallurgical furnaces and has for its object improvements in metallurgical furnaces. The invention relates more particularly to metallurgical furnaces employed in the reduction of zinciferous materials.

In our copending application, Serial No. 244,519, filed January 4, 1928, (which has since issued into United States Patent No. 1,749,127 of March 4, 1930), we have disclosed and claimed a method of reducing zinciferous materials containing lead. According to said copending application, the reduction process is more particularly practiced in a vertically disposed retort, the upper end of which extends well above the reduction furnace proper. This extension in fact constitutes an extension or a prolongation of the retort, and is generally referred to as an eliminator. A charge of zinciferous material and carbonaceous reducing agent in the form of agglomerates is progressively passed downwardly through said eliminator and retort, the charge substantially filling both the eliminator and the retort. The retort is externally heated, and the heat necessary for reduction of the zinc compounds present in the agglomerated charge is gradually driven into and through the charge. As the zinc compounds are reduced, the liberated zinc vapor, together with retort gases, rises and passes upwardly within the retort and the eliminator. Fresh agglomerates pass downwardly through the eliminator and retort at the same time. The agglomerates within the eliminator act as a filter to the rising zinc vapor. Lead (and other contaminants, such as tin, antimony, bismuth, and germanium, as more particularly disclosed in our copending application, Serial No. 244,401, filed July 4, 1928) present in the zinc vapor is selectively caught or retained by the hot agglomerates. Since the agglomerates within the eliminator (and retort) are progressively passed therethrough, the eliminating medium is substantially constantly renewed for the filtering of further amounts of zinc vapor. A substantially lead-free zinc vapor may be withdrawn from an exit provided in the eliminator. The zinc vapor is appropriately treated for the production of a merchantable product, such as zinc metal, zinc oxide or zinc dust.

The present invention relates to a metallurgical furnace particularly adapted for the practice of the process outlined in our above mentioned copending applications, whereby in the reduction of zinciferous materials containing lead and/or other contaminating metals, such foreign metallic impurities may be removed and a substantially pure zinc product is recoverable.

According to the present invention, a metallurgical furnace is contemplated which comprises a reduction chamber and an eliminator adjoining and communicating with said chamber, the eliminator being provided with means to regulate its temperature.

In the present preferred practice of the invention, the metallurgical furnace comprises a vertically disposed reduction retort, open at both ends, and a vertically disposed eliminator resting above and communicating with the retort. The communicating passageways of the eliminator and retort are preferably in substantial alignment with one another.

The retort is surrounded by a heating chamber, so that the walls of the retort may be externally heated. Heating gases may be provided by suitably burning such fuel as coal, oil, or gas. The heating chamber and/or retort may also be heated by means of electrical energy. Suitable temperature controls are provided to regulate the temperatures of reduction. Pyrometers, for example, may be inserted through the heating chamber walls in order to take measurements of the heating conditions maintained within various parts of the chamber. Various adjustments may then be made in the combustion of the fuel or in the amount of electrical energy consumed to provide a predetermined and desired operating temperature. The retort itself may be constructed of any suitable heat-resistant material, such as metal or heat-refractory brick and the like. In the present preferred practice of the invention, a retort constructed of heat-refractory brick is employed. The retort is open at both ends, so that charge materials may be progressively passed from the upper to the lower end, through the reduction zone. Spent residues are withdrawn from the lower end.

The eliminator is most advantageously placed adjacent to the retort. In the present preferred practice of the invention, the eliminator is vertically disposed and rests directly above the vertically disposed retort, the passageways of the two devices communicating with one another under operating conditions. This in effect places their passageways in substantial alignment with one another, which is highly desirable when the agglomerated charge is to be progressively passed through the eliminator and the retort by the action of gravity. An outlet is provided in the eliminator, preferably at or near the upper end thereof, for the withdrawal of liberated zinc vapor and retort gases. An inlet is also provided at or near the upper end of the eliminator for the introduction of charge materials. For intermittent or batch charging, the outlet and inlet may advantageously constitute one and the same opening to the eliminator. Under such operating conditions, a charge is introduced into the open end of the eliminator, and a zinc vapor treatment device is then placed over the opening. A similar device is of course used in connection with a separate gas-vapor outlet, which is preferably employed. In the case of manufacturing zinc metal, this device constitutes a condenser. When manufacturing zinc oxide, on the other hand, the outlet may merely lead into the open atmosphere, into which the zinc vapor and gas escape, the vapor being oxidized to zinc oxide. An alternative procedure, in the case of the manufacture of zinc oxide, is to surround the outlet of the eliminator with a compressed air chamber adapted to direct a blast of oxidizing air against the issuing stream of zinc vapor. When manufacturing zinc dust, on the other hand, a suitable cannister may be placed over the outlet of the eliminator.

Since the eliminator is to function as a filter to the zinc vapor passing therethrough, it should necessarily be maintained at a temperature best adapted to entrain or intercept the impurities to be removed from the zinc vapor. In order to obtain an effective eliminaton of lead, for example, which has a boiling point higher than zinc, the temperature of the eliminator and the eliminating medium confined therein must be accurately regulated selectively to catch the lead while permitting the zinc vapor to continue in transit as such. In the present preferred practice of the invention, the eliminator proper is insulated with a suitable layer of heat-insulating material, such as coal dust, diatomaceous earth or the like. The amount of heat-insulating material thus provided around the eliminator may in turn be regulated to effect the rate of dissipation of heat therefrom. To this end, a steel casing, jacket or the like, may be provided about the eliminator, thus providing a space between the casing and the walls of the eliminator proper which may be suitably filled with the heat-insulating material; or, a layer of insulating brick may be built around the eliminator; or, the eliminator itself may be constructed of relatively poor heat conducting material of such thickness best adapted to retain the necessary heat within the eliminator. The heat to be dissipated is of course supplied by the hot zinc vapor and retort gases passing from the reduction retort to and through the eliminator. The jacket preferably contains one or more doors on the side walls thereof, through which some of the heat-insulating material may be removed from time to time when it is found advisable to reduce the amount of heat-insulating material to effect greater dissipation of heat. It is therefore apparent that the temperature of the eliminator may be regulated by regulating the amount of heat-insulating material, or the type of heat-conducting material, surrounding the eliminator. To increase the temperature of the eliminator, for example, more insulating material is placed in the jacket. To decrease the temperature, insulating material is removed from the jacket. The eliminator proper is suitably constructed of any satisfactory heat-resistant material, such as metal or heat-refractory brick, and the like. In the present preferred practice of the invention, the eliminator is constructed of heat-refractory brick of the same type as that employed in the retort.

The connection provided between the reduction chamber or retort and the eliminator is of considerable importance. In the present preferred practice of the invention, the reduction retort and eliminator constitute separate and distinct units, their passageways registering with one another under operating conditions. For example, the eliminator may rest on the retort without bonding, thus forming a so-called dry joint. The eliminator then constitutes a separate and distinct unit, which unit is however supported by the retort. The reduction retort and the eliminator may also, however, constitute an integral unit. Such a unitary construction in effect makes for a monolithic structure that is zinc-vapor-tight. To this end, the eliminator proper preferably constitutes an extension or prolongation of the reduction retort. In the case of a vertically disposed retort, such as one constructed of metal, the eliminator may advantageously constitute an extension or prolongation of the same, also consisting of metal. In the case of a retort constructed of heat-refractory brick or the like, the eliminator is preferably a continuation of the same type of structure.

The present invention will, it is believed, be better understood by reference to the accompanying drawing, taken in conjunction with the following description, in which:

Fig. 1 is a sectional elevation of a vertically disposed smelting or reduction retort and eliminator, and auxiliaries for practicing the invention; and Fig. 2 is a detail section showing a modified joint of the retort and eliminator.

The metallurgical furnace comprises a vertical retort 10 mounted within a heating chamber or laboratory 11 of an appropriate furnace structure 12. The furnace structure rests upon concrete foundations 13. The retort may be heated by heating gases, formed by the combustion of coal, gas, oil or the like; or, by electrical energy; or, in any other appropriate manner. In the furnace shown in the drawing, an opening 14 is provided at or near the lower end of the structure for the introduction of oil or gas and air. A similar opening 15 is provided at or near the middle of the furnace structure for the further introduction of oil or gas and air. The highly heated combustion gases circulate in the heating chamber, as they pass around the retort, ultimately finding their way through an exit 16, which advantageously connects with a stack or chimney (not shown). Several spaced openings 17 extend through the furnace wall for taking pyrometric readings.

The furnace structure 12 comprises an outer metallic shell or casing 18, surrounding a wall 19 constructed of suitable heat-refractory brick. The heating chamber is surmounted by an arched heat-refractory brick roof 20. The top of the furnace structure consists of a metallic plate or covering 21. The space between this plate and the roof arch is filled with suitable heat-insulating material 22, such as diatomaceous earth.

The retort extends through the roof of the furnace structure. An upper extension or prolongation 23 rests above the retort. This prolongation is generally called an eliminator. As pointed out above, it is preferably a separate unit, superposed on top of the retort, as more particularly shown in Fig. 1. A dry joint 33 separates the retort and the eliminator. The weight of the eliminator on the retort is sufficient generally to provide a joint that is substantially zinc-vapor-tight. The eliminator may, however, be integrally built with the retort proper. The use of a dry joint is particularly advantageous to avoid objectionable results arising because of expansion and contraction effects taking place in the walls of the retort. As will be apparent on an inspection of the drawing, the retort walls are subjected to heating gases at highly elevated temperatures. The eliminator, however, extends beyond the heating chamber, and is relatively cooler. To avoid the carrying of stresses and strains in the retort walls to the walls of the eliminator, such a dry joint may be used to separate the two devices. In this manner, the retort may expand and contract independently of the eliminator.

The eliminator is surrounded by a layer of heat-insulating material 24, such as dust coal, appropriately confined by a surrounding sheet metal casing 25. This sheet metal casing is open at the top, so that its interior is accessible for the introduction, and removal, of the coal dust. Suitable doors 26 are provided at or near the lower end of the metal casing for the removal of heat-insulating material, if that becomes desirable.

A gas off-take pipe 27 is provided near the top of the eliminator, communicating with a zinc vapor treatment device 28. This device consists of a condenser, in case the zinc vapor is to be treated for the manufacture of zinc metal. If zinc oxide is to be manufactured, the device is adapted for the oxidation of the escaping zinc vapor to zinc oxide. On the other hand, if zinc dust is to be produced, the device consists of a canister adapted for the manufacture of zinc dust.

The upper end of the eliminator or prolongation is provided with a charging device 29, adapted to keep charge materials away from the off-take pipe. The top of the eliminator is provided with a removable cover 30. It may here be pointed out that if the metallurgical apparatus is to be used for the batch reduction of zinciferous material, the cap 30 is removed for the introduction of fresh charge material after which it is replaced until such time as more charge materials are to be introduced. On the other hand, if the charge materials are to be introduced into the metallurgical furnace substantially continuously, the cap is removed so that the charge materials may be constantly and substantially continuously fed to the charging device.

The lower end of the vertical retort extends through the bottom of the furnace structure, and preferably communicates with a sleeve 31 attached to the underside of the bottom of the furnace structure. The passageways of the retort and of this sleeve are in substantial alignment with one another, so that residues may be freely moved therethrough. A revolving platform 32 is located directly below the lower end of the vertical retort and sleeve, so that spent residues may be removed by the revolving movment of this device. If the furnace is operated under batch conditions, the platform may be revolved intermittently. On the other hand, if the charge materials are fed to the reduction operation substantially continuously, the platform is made to operate continuously, so that residues may be removed substantially as fast as fresh charge materials are introduced.

Referring more particularly to Fig. 2, it will be seen that the eliminator and the retort constitute a unitary structure, the eliminator resting, however, on the retort. No joint is provided between the retort and the eliminator, as is the case in the practice shown in Fig. 1.

The above described apparatus is preferably operated as follows:

The lid 30 is removed, and agglomerates of mixed zinciferous material and carbonaceous reducing agent are introduced into the upper end of the eliminator or prolongation 23, through the charging device 29. This charging device is of such construction that no air enters the top of the retort and little or none of the gaseous product escapes, particularly when the cap 30 has been replaced; and agglomerates are introduced without blocking the gas off-take pipe 27. The vertical retort 10, including its upper prolongation or extension 23, is filled with agglomerated charge up to about the level of the gas off-take pipe 27. The spent residues or worked-off charge materials are withdrawn from the bottom of the retort 10, thereby making room for the introduction from time to time of fresh agglomerates through the charging device 29. In the preferred practice of the invention, the retort is operated in a substantially continuous manner. That is to say, fresh agglomerates are frequently introduced into the system.

That portion of the retort 10 within the heating chamber 11 is heated to a sufficiently high temperature to bring about the reduction of the compounds of zinc in the smelting zone of the retort, and the liberation of the resulting metallic zinc vapor. The gaseous products of the reducing operation rise in the retort and pass through the relatively cooler agglomerates confined in the prolongation or eliminator 23. These agglomerates are about to enter the smelting or reduction zone of the retort 10, but while functioning as the de-leading medium they are superposed on the main body of agglomerates undergoing reduction.

The temperature of the body of agglomerates within the eliminator 23 is controlled by increasing or diminishing the amount of heat-insulating material 24 confined within the metal casing 25. The thickness of the layer of heat-insulating material is in the first instance of course determined by the size of the metal casing. Other appropriate temperature regulating means may, of course, be employed to control the operating temperature of the eliminating medium confined within the prolongation 23. The temperature of the eliminating medium should be so regulated as to maintain the agglomerates at a temperature sufficiently low to effect substantial elimination of lead without condensing any substantial amount of zinc vapor. The thus deleaded gases and vapor pass through the off-take pipe 27 into the zinc vapor treatment device 28; such as a condenser, where substantially all of the zinc vapor may be condensed to zinc metal.

The following specific example illustrates the practice of the reduction process outlined in our above-mentioned copending application, in the metallurgical furnace of the present invention, although it is to be understood that this example is merely illustrative and is in no sense to be regarded as restrictive of the invention.

The charge was made up of approximately 50 parts by weight of finely divided zinc ore (containing from 65-70% of zinc and from 1.5 to 3.5% of lead) and 50 parts by weight of a bituminous coking coal. The zinc ore and coal were each crushed so that approximately 80% passed through a 20-mesh screen, and were then dumped into a dry pan Chilian mill and subjected to the mixing and comminuting action of the mill for some minutes. From the Chilian mill, the mixed material was taken to a briquetting press and formed into semi-round briquettes by a compressive force of approximately 2000 pounds to the square inch.

The briquettes, without drying, were charged into an externally heated vertical coking retort. In this retort the briquettes were subjected to a coking temperature of about 950° C. for about 1½ hours. The coked briquettes were transferred without substantial loss of heat from the coking retort to the prolongation 23 of the vertical smelting retort and introduced therein at the rate of approximately 180 pounds at intervals of 45 minutes. The temperature within the heating chamber 11 was about 1100 to 1250° C. and the body of deleading agglomerates in the prolongation 23 was maintained at a temperature of about 800 to 900° C. In the particular example being discussed, the retort 10 was about 25 feet long (high) and slightly over 15 inches internal diameter, while the prolongation 23 was about 8 feet long. The retort 10 and prolongation 23 were built as a unitary structure of silicon carbide circle brick, supported solely at the base and not otherwise tied into the furnace structure.

The upper level of the briquetted charge was maintained at the level of the off-take 27. This was accomplished by withdrawing from the bottom of the retort 10 an appropriate amount of worked-off briquettes while charging fresh briquettes into the top of the retort. The column or body of briquettes in the prolongation 23 of the retort above the top of the furnace structure 12 was approximately 6 feet in height.

The gaseous products of the reducing operation taking place in the highly heated portion of the retort 10 was conducted through the superposed body or column of relatively cooler briquettes in the prolongation 23 and thence through the off-take pipe 27 to the device 28. This gaseous product consists for the most part of metallic zinc vapor, carbon monoxide gas and small percentages of lead, and of itself provides a strongly reducing atmosphere within the prolongation 23. In passing through the column of deleading briquettes in the prolongation 23, substantially all of the lead was removed from the gaseous product and remained with the deleading briquettes. In the example under discussion, the lead content of the zinc metal collected in the condenser 28 varied from 0.019 to 0.050%. Operating under the same conditions, except that the upper level of the briquetted charge in the retort is maintained at about the level of the arch 20 of the furnace structure 12, the lead content of the condensed zinc metal varies from 0.5 to 1.25%. Likewise, working this same ore in an ordinary zinc distillation furnace in accordance with the customary spelter retort practice, the resulting zinc metal contains 1% lead and over.

Applying the principles of the invention to a zinc ore containing a relatively small amount of lead, smelted in accordance with the method of the invention just described, we have succeeded in producing zinc metal containing from 0.0024 to 0.0032% lead. Treating this same ore by the same procedure, but maintaining the charge level in the retort at about the level of the furnace arch, the resulting zinc metal contains from 0.08 to 0.12% lead. Likewise, in treating this same ore in accordance with the present spelter retort practice, the resulting zinc metal contains from 0.08 to 0.12% lead.

The lead removed from the gaseous product of the smelting operation by the deleading body of agglomerates accompanies the agglomerates into the smelting zone of the retort in a condition or form less readily returned to the gaseous product than the condition or form in which the lead occurs in the zinciferous material. Just what happens to this lead in the smelting zone, we are not prepared to say, but it, in large part at least, passes out of the bottom of the retort with the worked-off residues. Whatever the correct explanation of the phenomenon may be, the facts themselves are clear, and almost complete deleading of the gaseous product is effected in its passage through the temperature-controlled deleading body of agglomerates.

It will be clear from the foregoing description that careful regulation and control of the temperature of the body of deleading agglomerates, or other form of zinciferous and/or carbonaceous material of the smelting charge, is essential for the effective elimination of lead without the condensation of any substantial amount of zinc vapor. This temperature regulation and control is most advantageously accomplished in the apparatus illustrated in the drawing by controlling the heat dissipation from the prolongation 23. This may be conveniently done by providing the sheet metal casing 25 with doors 26, or the like, through which the dust coal insulation 24 surrounding the prolongation 23 may be increased or diminished. Other appropriate means of temperature regulation and control may be used. The temperature of the gases within the prolongation 23 is determined by appropriately positioned pyrometers or other heat measuring instruments.

The advantages of the invention will be manifest to those skilled in the art. The lead elimination is effected by the smelting charge itself, and preferably just preceding its introduction into the reducing chamber. By superposing the deleading body of charge on the charge undergoing reduction, all extraneous apparatus is avoided and joints or mechanical connections through which air might leak into the system are eliminated. Furthermore, the superposed column of deleading agglomerates provides a relatively long path for the deleading operation, and affords excellent opportunity for close temperature control.

It is important that the deleading body of charge be maintained in a reducing atmosphere free of any oxidizing influences. To prevent air or oxidizing gases from being carried into the prolongation 23 during the introduction of fresh charge, it is our preferred practice to introduce the charge into the prolongation 23 at a temperature at which there is sufficient gas evolution from the fresh charge to prevent the entraining of air. Should air or other oxidizing gas leak into or otherwise enter the deleading body of charge, the effectiveness of the lead removal will be seriously impaired, if not completely destroyed. This is one of the chief advantages resulting from our preferred unitary construction of the retort 10 and prolongation 23, since air leakages are thereby effectively inhibited.

In the preferred practice of the invention, however, we allow regulated amounts of air to seep into the lower end of the retort. Under properly controlled conditions, it is advantageous to have some air enter the retort. The oxygen of the air assists in the elevation of the temperature by its heat of combustion. If the amount of air permitted to seep into the retort is carefully controlled, the reduction process proceeds more rapidly. When manufacturing zinc metal, for example, the air entering the retort may be kept down to an amount that does not deleteriously affect the condensation of the liberated zinc vapor to zinc metal. It is for that reason that the lower end of the retort is not sealed. With an open bottom, as shown in the drawing, regulated amounts of air may be allowed to seep into the retort.

While in our preferred practice, the deleading medium is composed of the mixed reducing or smelting charge, the medium may, if desired, be composed of any ingredient of the reducing charge, such as the zinciferous material alone, or the reducing agent alone. Again, while it is our preferred practice to superpose the deleading medium on the charge undergoing smelting, thereby simplifying the operation and facilitating renewal of the deleading medium, other ways of confining the deleading medium and of renewing the medium from time to time may be employed. We consider it advantageous progressively to move the deleading medium in a direction opposite to that of the direction of flow of the gaseous product, and to renew the medium from time to time by fresh deleading material added thereto at a temperature approximating the temperature at which the medium is maintained.

While we have particularly described the recovery of the metallic zinc vapor from the deleaded gaseous product in the form of zinc metal or spelter, it is to be understood that the vapor may be recovered in other forms of zinc products. Thus, the zinc vapor may be condensed as zinc dust, or it may be oxidized and collected as zinc oxide. In any case, the practice of the invention enables the production of zinc products more nearly lead-free than could otherwise be obtained by pyrometallurgical methods from the lead-containing zinc ores.

We claim:

1. A metallurgical furnace comprising a reduction chamber, and an eliminator adjoining and communicating with said chamber, said eliminator having a passageway for the movement therethrough of charge materials to be fed into the reduction chamber, and means for regulating the temperature of said eliminator including variable depths of heat-insulating material around the eliminator.

2. A zinc metallurgical furnace comprising a reduction chamber, an eliminator adjoining and communicating with said chamber, and means for regulating the temperature of said eliminator including heat-insulating material surrounding the eliniator at least in part which may be varied in amount.

3. A zinc metallurgical furnace comprising a vertically disposed reduction retort open at both ends, a lead eliminator communicating with and resting on said retort, and means for regulating the temperature of the eliminator consisting of heat-insulating material confined in a jacket surrounding said eliminator at least in part.

4. A zinc metallurgical furnace comprising a vertically disposed reduction retort with imperforate walls open at both ends and surrounded by a heating chamber, a vertically disposed lead eliminator with imperforate walls resting exteriorly of and directly above and communicating with the retort, said retort and eliminator forming separate units divided by a dry-joint that is zinc-vapor tight under operating conditions and heat insulating material surrounding the lead eliminator for regulating the temperature of the elimintor, said lead eliminator in turn communicating with a zinc vapor treatment device.

5. A zinc reduction furnace which comprises a vertically disposed imperforate zinc vapor tight walled externally heated retort with an opening at or near the top for the introduction of fresh charge materials and an opening at or near the bottom for the withdrawal of spent residues, a heat-insulated lead eliminating device with imperforate zinc vapor tight walls in association with the retort at or near its upper end through which liberated zinc vapor and evolved retort gases coming from the retort may pass, and a zinc vapor treatment device in open communication with said lead eliminating device for receiving deleaded zinc vapor as well as accompanying retort gases.

6. A zinc reduction furnace according to the preceding claim, in which the lead eliminating device is also vertically disposed, the passageways of both the lead eliminating device and the retort being in alignment with one another so that charge materials about to be subjected to a reduction operation and confined in the lead eliminating device may function as a lead eliminating medium after which the charge materials may be progressively moved by gravity to and through the retort.

7. A zinc metallurgical furnace comprising a vertically disposed reduction retort with imperforate zinc vapor tight walls positioned within a heating chamber structure so that the retort except for its upper and lower ends is completely surrounded thereby, a vertically disposed lead eliminator unit with imperforate zinc vapor tight walls mounted exteriorly of and directly above the reduction retort so that the passageways of the eliminator and the retort are in substantial alignment with one another to hold a continuous column of charge material, a lead-free zinc-vapor treatment device in open communication with the lead eliminator at its upper end, the eliminator being openable at its upper end for the introduction of charge materials, and the retort being openable at its lower end for the withdrawal of spent solid residues.

8. A zinc metallurgical furnace according to the preceding claim, in which a jacket is spaced from and surrounds the lead eliminator unit at its sides, and heat insulating material in the space between the jacket and the sides of the lead eliminator.

In testimony whereof we affix our signatures.

EARL H. BUNCE.
GEORGE T. MAHLER.